F. BRAMER.
Wheel-Harrow.
No. 204,793. Patented June 11, 1878.
Fig. 1.
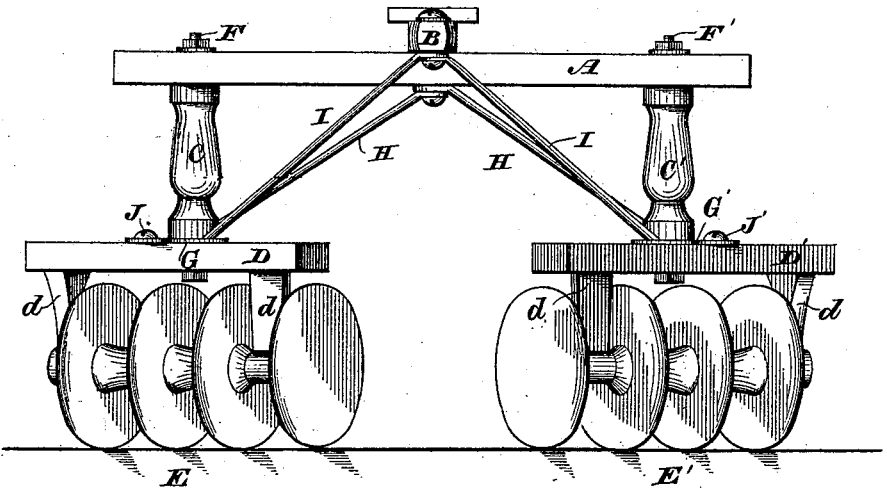
Fig. 2.
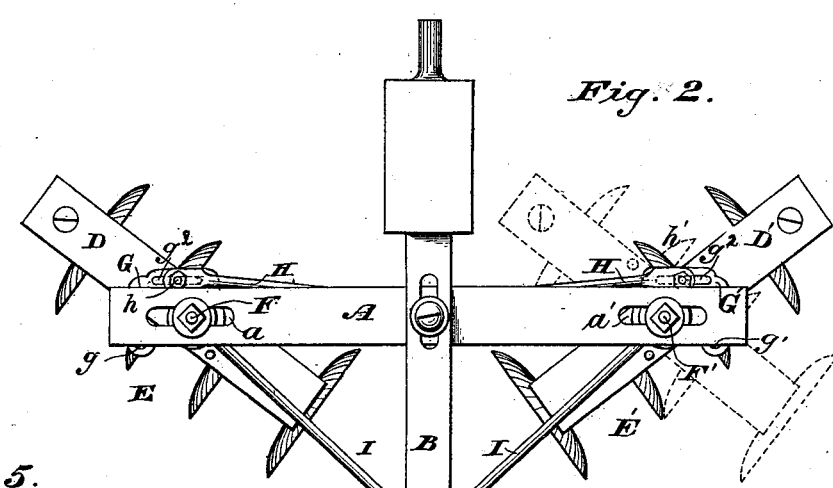
Fig. 5. Fig. 3. Fig. 4.
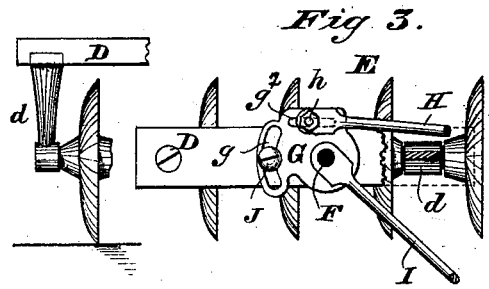
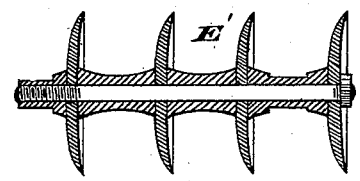
WITNESSES
Wm A Hinkle
Roberdeau Buchanan
INVENTOR
Frank Bramer
By his Attorneys
Baldwin, Hopkins & Peyton

UNITED STATES PATENT OFFICE.

FRANK BRAMER, OF LITTLE FALLS, NEW YORK.

IMPROVEMENT IN WHEEL-HARROWS.

Specification forming part of Letters Patent No. 204,793, dated June 11, 1878; application filed May 23, 1878.

*To all whom it may concern:*

Be it known that I, FRANK BRAMER, of Little Falls, in the county of Herkimer and State of New York, have invented certain new and useful Improvements in Wheel-Harrows, of which the following is a specification:

My invention relates to a wheel-harrow cultivator, whereby the advantages of the action of a series of rotating disks or wheels upon the soil, either upon one or both sides of a row of standing plants, to throw the soil either toward or from the plants, as desired, may be secured, the harrow shown being provided with two gangs or series of disks, so attached to a high draft-frame as to leave a central space, which permits the harrow to straddle the row being cultivated without injury to the plants.

The objects of my invention are, first, to provide means whereby the disk-gangs may conveniently, quickly, and securely be adjusted, independently of each other, to vary their working angles relatively to the line of draft; secondly, to render the disk-gangs reversible, to enable the disks to work the soil either toward or away from the standing plants; thirdly, to provide simple and effective means for regulating or adjusting the space between the inner ends of the disk-gangs; and, fourthly, to furnish a light, cheap, durable, and effective cultivating wheel-harrow.

The subject-matter claimed hereinafter specifically will be designated.

In the accompanying drawings, which show my improvements as embodied in a harrow in the best way now known to me, Figure 1 represents a front elevation of my improved wheel-harrow, showing the disk-gangs as placed at an angle to the line of draft, with their inner ends advanced, in which position the disks will throw or roll the soil toward the standing plants. The dotted lines show a disk-gang as reversed, with its outer end in advance, in which position the soil will be thrown from the plants. Fig. 2 is a plan or top view thereof; Fig. 3, a plan or top view of one of the disk-gangs detached, partly in section, with portions of the gang-bar and bracing or strengthening rods broken away, the gang being shown as adjusted to a different position or angle relatively to the line of draft from that shown in Figs. 1 and 2; and Figs. 4 and 5 are views of portions of the disk-gangs detached.

A main frame or transverse beam, A, carrying a draft pole or tongue, B, is supported by standards C C' rising from the gang-bars D D', which bars are provided with down-hangers or supports d d, forming bearings for the axles of the respective gangs E E' of harrow disks or wheels, said disks being of the usual or of any preferred construction.

The gang-bars are pivoted on one side of their center, or nearer one end than the other, in this instance, but about in the center of the soil-working devices, upon the ends of clamping-rods F F', passing down through the vertical standards C C', which rods connect and hold or clamp together the gang-bars, standards, and main frame or transverse beam. The gang-bars or gangs may, however, be otherwise pivoted.

The gang-bars are thus rendered horizontally adjustable around vertical pivots, in order to vary the working angles of the disks relatively to the line of draft and render the gangs capable of being reversed. To rigidly fix or secure the bars in their adjusted position, I employ slotted plates G G', surrounding the clamping-rods F F', and interposed in this instance between the standards C C' and upper surface of the gang-bars. The plates are braced against turning movements by suitable rods H H and I I, projecting, respectively, from beneath the main frame or transverse beam A and from the draft-pole B, in front of said frame. Suitable set bolts or screws J J', inserted in proper openings in the gang-bars, pass through the curved slots $g$ $g^1$, formed in extensions of the plates G G', by loosening which the gang-bars can be turned horizontally around their vertical pivots to any desired angle, and then be rigidly secured by simply retightening the bolts, which clamp the bars and slotted plates firmly together. By entirely removing the bolts J J' from the gang-bars, the said bars can be revolved or turned half-way round, thus reversing them; and when so reversed the bolts may be reinserted through the slotted plates into other openings in the bars, provided for the purpose, now brought into line with the slots in the plates, and be firmly screwed up or tightened.

Both gangs or gang-bars being thus separately adjustable and reversible, it will be obvious that, as the wheels or disks have concavo-convex faces or sides, I am enabled to adjust the disks to work the soil either toward or from the standing plants.

I render the gang-bars laterally adjustable, or toward and from each other, by means of longitudinal slots $a\ a'$ in the main frame or transverse beam A, in which slots the upper ends of the clamping bars or rods F F' work, as clearly shown in Fig. 2; this adjustment being permitted at the base of the standards or clamping-rods by slots, $g^2$, in the plates G G', in which slots clamping-bolts $h\ h$, carried by the ends of the bracing-rods H H', work, and when set or tightened secure the said rods and slotted plates together. The brace-bars I I accommodate this adjustment by turning on their pivot connecting them with the tongue, the latter being rendered adjustable backward and forward by means of a slot and set-screw or bolt on the main frame or beam. The same adjustment might, however, be attained by making the braces adjustable endwise at their ends, as hereinbefore described with reference to the other braces, H H.

It will thus be seen that I obtain in a cultivating wheel-harrow a high main frame supported and rigidly braced upon standards rising from the gang-bars, between which bars there is a central space amply sufficient to straddle the row being cultivated without injuring the plants; that the angle of the wheel or disk gangs relatively to the line of draft may be varied by a single bolt; that the gangs may be reversed and locked by a single bolt, being the same by which the angle of the disks may be varied; that the space between the gangs may be increased or diminished; that the gangs may be adjusted laterally independently of their reversing movement; and that the harrow, while possessing the capacities above enumerated, is strongly braced against strains of any character.

I intend in some instances to employ a harrow without a high main frame, as hereinbefore described, and have the adjustable reversible wheel-gangs so arranged that they can be used between the rows of plants instead of straddling them.

Having thus fully described my invention, what I claim as new, and desire to secure by Letters Patent, is—

1. A wheel-harrow cultivator consisting of the combination of a pole or tongue, a high main frame, wheel-gangs supporting the high frame through the medium of rigid fixed standards interposed between the gang-bars and main frame, and rods for bracing the wheel-gangs against independent movements and injurious strains.

2. The combination, substantially as hereinbefore set forth, of the main frame, the gang-bar, the interposed supporting-standard, the brace-rods, the slotted plate secured to the brace-rods, and the adjusting-screw or set-bolt on the gang-bar.

3. The combination, substantially as hereinbefore set forth, of the slotted main frame or beam, the pivoted gang-bars, and the doubly-slotted plates, said plates being connected to brace-rods by set-bolts working in one set of slots, and to the gang-bars by set-bolts working in the other or curved slots, whereby the working angle of the disks relatively to the line of draft may be varied and the disks adjusted laterally relatively to said line of draft.

4. The combination, substantially as hereinbefore set forth, of a main frame, reversible wheel or disk gangs, and mechanism for locking the gangs, whereby each gang may be turned end for end on its pivot and securely locked.

5. A wheel-harrow provided with reversible disk-gangs, the disks or wheels having concavo-convex sides or faces, whereby either the concave or convex faces of the wheels may be brought opposite each other, as set forth.

6. A wheel-harrow provided with reversible disk-gangs, one on each side of an intermediate tongue or draft frame, the gangs being also capable of independent lateral adjustment relatively to the line of draft to vary the space between the inner ends of the gangs.

In testimony whereof I have hereunto subscribed my name.

FRANK BRAMER.

Witnesses:
  G. G. CROWLEY,
  SIDNEY A. LOOMIS.